United States Patent [19]

Deutsch

[11] Patent Number: 4,840,018
[45] Date of Patent: Jun. 20, 1989

[54] LUBRICATION DISTRIBUTION SYSTEM FOR A COTTON HARVESTER

[75] Inventor: Timothy A. Deutsch, Newton, Iowa

[73] Assignee: Deere & Company, Moline, Ill.

[21] Appl. No.: 174,070

[22] Filed: Mar. 28, 1988

[51] Int. Cl.⁴ .............................................. A01D 46/18
[52] U.S. Cl. .......................................... 56/12.3; 56/41; 137/561 A
[58] Field of Search ....................... 56/12.3, 28, 40, 41; 184/6, 7.3, 7.4, 8; 137/561 R, 561 A, 861

[56] References Cited

U.S. PATENT DOCUMENTS

| | | | |
|---|---|---|---|
| 2,089,523 | 8/1937 | Wupper | 184/7 |
| 2,467,722 | 4/1949 | Baker | 184/6 |
| 2,721,436 | 10/1955 | Hubbard | 56/47 |
| 2,723,520 | 11/1955 | Hubbard | 56/47 |
| 2,959,249 | 11/1960 | Gothberg et al. | 184/7 |
| 3,144,096 | 8/1964 | Rotter | 184/7 |
| 3,163,258 | 12/1964 | Thomas | 184/7 |
| 3,219,145 | 11/1965 | Hubbard et al. | 184/7 |
| 3,530,881 | 5/1967 | Tanner | 137/561 R |
| 4,712,578 | 12/1987 | White | 137/561 A |
| 4,769,978 | 9/1988 | Reichen et al. | 56/28 |

OTHER PUBLICATIONS

U.S. patent application Ser. No. 068,758 filed Jun. 24, 1987 by Ronald L. Reichen.

*Primary Examiner*—John Weiss

[57] ABSTRACT

An automatic lubrication distribution system includes a conduit system for supplying equal volumes of grease to each of a plurality of row units, the row units each supporting a manifold which is connected to the conduit system and proportions the grease received therefrom to simultaneously supply first and second grease receiving areas having substantially different grease volume requirements. The distribution system, from the supply pump to the grease receiving areas, is completely passive and reqiures no control valves, flow dividers or metering pumps.

12 Claims, 2 Drawing Sheets

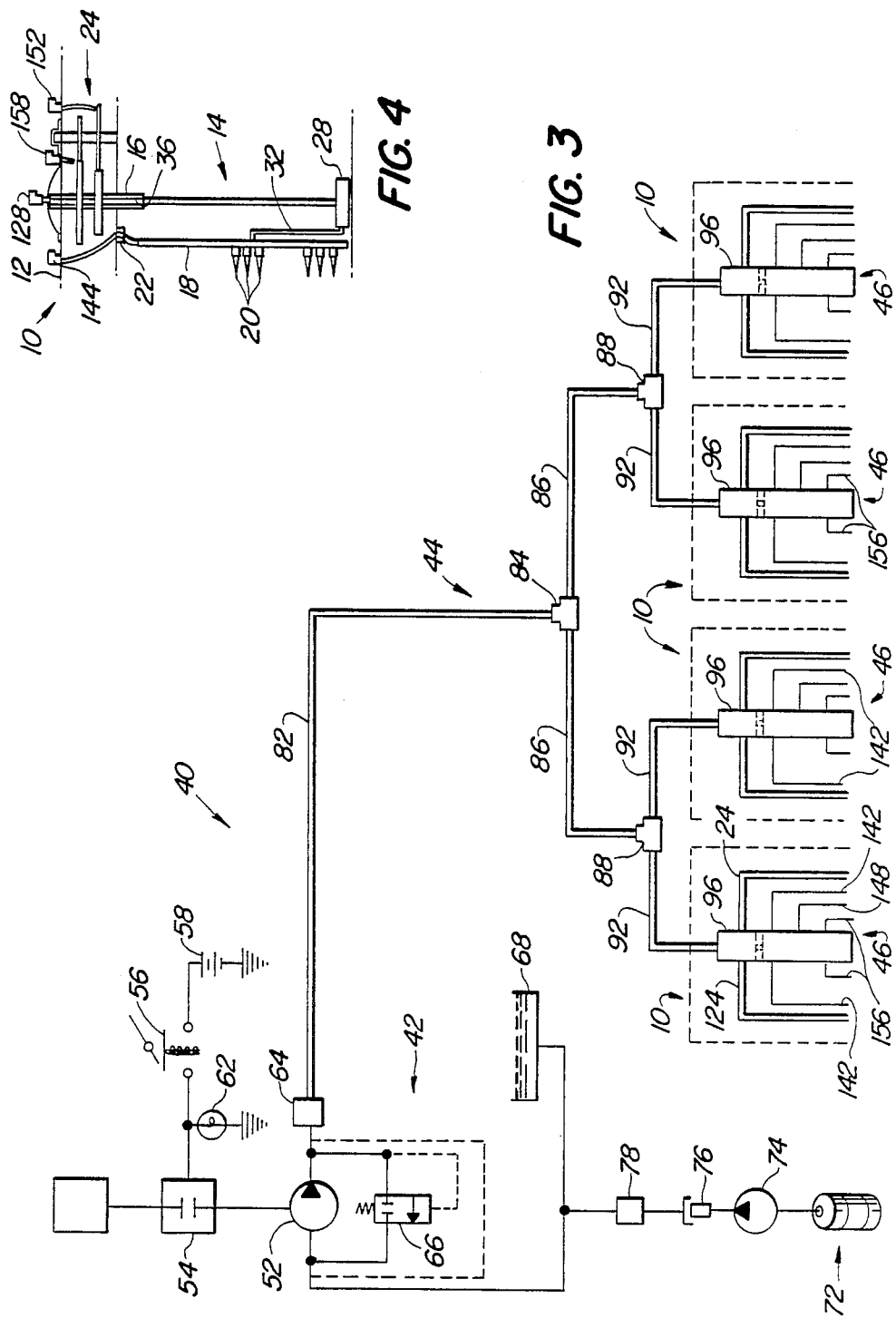

LUBRICATION DISTRIBUTION SYSTEM FOR A COTTON HARVESTER

BACKGROUND OF THE INVENTION

The present invention relates generally to cotton harvester, and more specifically to an improved lubrication system for providing the proper amount of lubricant to a plurality of lubrication points on the row units of a harvester.

A typical cotton picker includes two to four row harvesting units, each unit including a pair of upright picking drums located beside a row-receiving area. Each drum includes twelve to sixteen vertical picker bars, each having an upper arm member with a cam follower riding in a cam track which orients picker spindles journalled in the bar one above the other and driven by a drive shaft extending through the bar. A drive gear arrangement located in the unit housing transmits power from row unit input drive shafts to the drum and spindles.

The various drives, cams and picker bars on each row unit must be lubricated frequently to prevent premature wear and failure. In previous years, as many as twenty-eight individual lubrication fittings were provided on the row unit of a typical cotton harvester, and each fitting had to be located and provided with the proper amount of lubricant at least daily during the harvesting season. Too much lubricant in certain areas can contaminate the spindles and harvested cotton, while too little can reduce the life of expensive components and increase down time.

To overcome some of the problems involved in previous lubrication systems, an on-board grease system was devised and is the subject matter of co-pending application Ser. No. 068,758 filed June 24, 1987, which is a continuation of Ser. No. 648,862 filed Sept. 7, 1984 and is of common ownership with the present application. In that system, grease is supplied by a grease pump to a two position, three way, operator controlled valve. The valve selectively controls distribution of grease to two feed lines. The first feed line is connected to manifolds, and each of the manifolds directs lubricant equally through four sized conduits. Each of the sized conduits feeds one of the four picker drums on a pair of adjacent row harvesting units. The sized conduits present an approximately equal resistance to lubricant flow from the respective manifold and are connected to a grease cavity at the lower end of the picker drum which distributes the lubricant to the picker bars. The second feed line directs lubricant to two other manifolds, each of which directs the proper amount of lubricant through sized conduits to at least five different locations on each of two adjacent row units. The previously described system provides an automatic lubrication system which eliminates complicated and expensive flow dividers and metering pumps. However, the operator controlled valve adds expense and complexity to the system and requires that the operator time two separate lubrication operations, including a high volume operation which supplies grease to the picker bars and a much lower volume operation which supplies grease to the cams and the gears located within the upper portion of the row units. In the previously described system, the cams and gears can be lubricated in as little as ten seconds while the high volume grease cavities require approximately two and one-half minutes for filling. If the operator forgets to lubricate the cams and gears for the short period of time, serious damage can occur to the cams and transmission.

BRIEF DESCRIPTION OF THE INVENTION

It is therefore an object of the present invention to provide an improved lubrication distribution system for a harvester. It is a further object to provide such an improved system which accurately and reliably lubricates a relatively large number of service locations, including locations having significantly different grease volume requirements. It is a further object to provide such a system which does not require an operator controlled valve or other expensive flow control or flow metering structure.

It is yet another object of the present invention to provide an improved lubrication distribution system for a cotton harvester which requires only a single grease pump and relatively inexpensive and non-complicated passive flow control elements to provide the proper amount of lubrication to various areas on the row unit including areas requiring a large volume of lubricant as well as areas which require substantially less lubricant. It is a further object to provide such a system which obviates the need for an operator controlled valve and which requires only a single timing operation, all the different areas on the row units being lubricated simultaneously during this single timed operation.

It is still a further object of the present invention to provide an improved lubrication distribution system for a harvester wherein a plurality of grease-receiving areas are simultaneously supplied with grease, and wherein the proportion of the total amount of grease received by each area is determined entirely by passive resistance means without the need for control valves, flow dividers or metering pumps or the like. It is a further object to provide such a system which utilizes sized lubricant flow lines, manifolds and orifices to provide the proper amount of lubricant to each area.

In accordance with the above objects, an improved lubrication distribution system is provided having a constant displacement grease pump connected to a source of grease on a cotton harvester and having an output connected by supply lines to a manifold associated with each of the row units. The manifold includes an input connected to a supply line and a first chamber in communication with the input. First grease receiving areas on the row unit, such as the reservoirs for providing relatively large volumes of grease to the two picker drums on the row unit, are connected by sized lines to the first chamber for receiving approximately equal volumes of grease therefrom. A second manifold chamber is connected to the first via a restrictor. The second chamber is connected by a plurality of sized lines to various cam and transmission areas. The orifice provides a portion of the grease received from the supply line to the second grease receiving areas at the same time the first grease receiving areas are being supplied.

The entire distribution of grease from the pump to the grease receiving areas is controlled by passive resistance without the need for control valves, flow dividers or metering pumps. The system therefore is relatively inexpensive, reliable and compact. Only one greasing operation has to be timed, and all areas are greased simultaneously thereby simplifying the greasing operation. The manifold for each row unit has a narrow profile and may be conveniently mounted on the harvester row unit top panel. Each manifold is connected to a flexible supply line to facilitate transverse movement of the row units, for example, when the row units are adjusted for differing row widths or when they are moved relative to each other to accommodate servicing.

These and other objects, features and advantages of the present invention will become apparent to those skilled in the art from the description which follows and from the drawings.

BRIEF DESCRIPTION OF THE DRAWINGS

FIG. 3 is a schematic representation of the grease distribution system.

FIG. 4 is a schematic representation of a portion of the row unit generally showing the grease receiving areas serviced by the distribution system of the present invention.

DESCRIPTION OF THE PREFERRED EMBODIMENT

Figure 1:
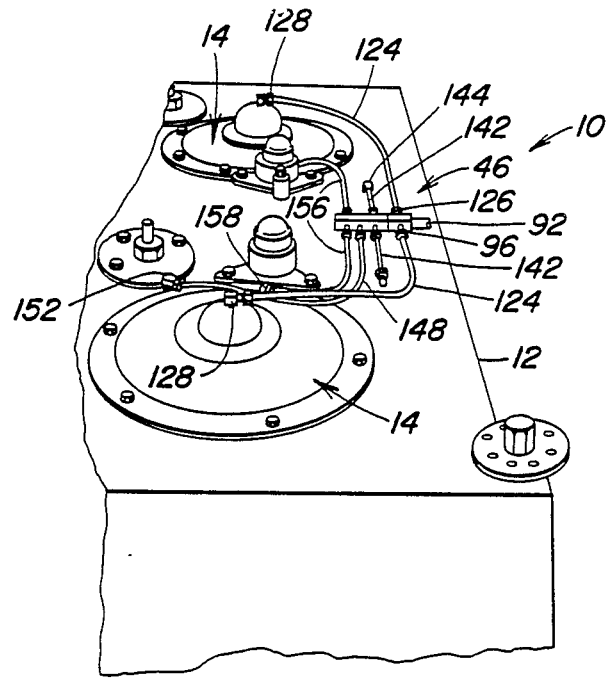
FIG. 1 is a perspective view of a portion of a row harvesting unit for a cotton harvester and showing a portion of the grease distribution system of the present invention attached thereto.

Referring to FIGS. 1 and 4, there is shown a portion of a row harvesting unit 10 for a cotton picker. The row harvesting unit includes a unit housing 12 supporting a pair of upright picker drums 14 for rotation about the upright axis of drum shafts 16. Each picker drum 14 includes a plurality of upright picker bars 18 journalling a plurality of vertically spaced spindles 20 for rotation by a drive gear arrangement (not shown) within the bar. As the drum 14 rotates, the spindles 20 are oriented by a cam arrangement 22 supported by the unit housing 12. The drums 14 are rotated by conventional drive transmission 24 located above the cam structure 22 and below the top plate of the unit housing 12. A grease reservoir 28 is located at the bottom of the picker drum 14 and is connected via bar lubrication lines 32 to the individual picker bars 18 to supply grease to the bars. A relatively large volume of grease must be supplied to the reservoir 28 to lubricate the picker bars 18, while a substantially smaller amount of grease must be supplied to the cam structure 22 and to the drive transmission 24. The drum shaft 16 includes a hollowed conduit portion indicated generally in FIG. 4 at 36 for supplying grease to the reservoir 28 from the top of the housing 12, as will be described in detail later. The row units 10 are generally of conventional construction and so are described only in sufficient detail to orient the lubrication distribution system of the present invention. If further background information relating to the operation and structure of the row unit is desired, reference may be had to the aforementioned U.S. patent application Ser. No. 068,758 as well as to U.S. Pat. Nos. 4,249,365; 4,282,702; and 3,219,145, which are commonly assigned with the present application and which are incorporated herein by reference for purposes of background material.

The lubrication distribution system of the present invention, indicated generally at 40 of FIG. 3, includes a source of pressurized lubricant or grease 42 located on the cotton picker and connected to a supply line or conduit system 44 which in turn is connected to individual manifold distribution systems 46 located on the row units 10. As shown in FIG. 3, the cotton harvester includes four row units 10 and four distribution systems 46. The source of lubricant 42 includes a constant displacement gear pump 52 mounted on the harvester adjacent the harvester engine and driven by an electrically operated clutch 54 which is selectively activatable by an operator control switch 56 connected between the clutch and the vehicle battery 58. An indicator lamp 62 is also connected to the switch 56 to provide an indication of activation of the clutch 54.

The pump 52 includes an output port connected through a strainer 64 to the conduit system 44. The output port is also connected through a pressure relief valve 66 to the input port of the pump so that if the pressure at the output of the pump exceeds a preselected value, grease will be recirculated from the output to the input. The input of the pump 52 is also connected to a grease reservoir 68 located on the implement. The reservoir 68 may be filled from an external grease supply 72 via a grease pump 74, connector 76 and strainer 78.

The conduit system 44 includes a single hose or conduit 82 connected to the output of the pump 52 and extending to the front of the cotton harvester. The conduit 82 is connected to a t-connector 84, and two generally identical conduits 86 extend transversely in opposite directions from the connector 84 to t-connectors 88 positioned adjacent the outer pairs of row units 10. The conduits 86 are of equal length and equal inner diameter to provide substantially equal resistance to grease flow therethrough so that equal volumes of grease are provided to both of the t-connectors 88. Conduits 92 extend from the t-connectors 88 to the individual manifold distribution systems 46. The conduits 92 are preferably of equal length and equal inner diameter so that each provides equal resistance to grease flow therethrough.

Figure 2:
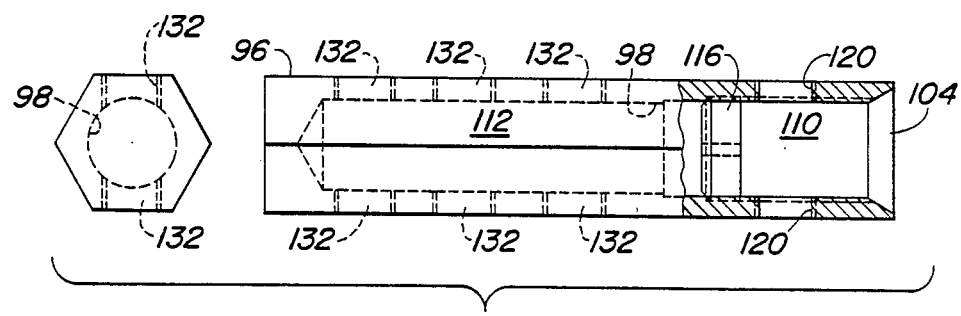
FIG. 2 is an enlarged view partially in section of a manifold utilized with the distribution system of FIG. 1.

The manifold distribution system 46 includes an elongated, low profile manifold 96 which, as seen in FIG. 2, is fabricated from a hexagonal piece of stock material having a bore 98 formed therein. The manifold 96 includes an input 104 adapted to receive the end of the corresponding supply conduit 92 (FIG. 1). The manifold is divided into a first chamber 110 and a second chamber 112 downstream of the first chamber by an orifice or restrictor 116 which is threaded into the input end of the bore 98. A pair of holes 120 are provided in the opposite sides of the manifold 96 and open into the first chamber 110. Equal resistance lines 124 having input ends with connectors 126 threaded into the holes 120 are routed along the top panel of the unit housing 12 to the top of the covers of the picker drums 14. The output ends of the lines 124 are attached to connectors 128 which are in communication with the hollowed conduit portion 36 of the respective picker drum shafts 16 for supplying a relatively high volume of grease to the reservoirs 28.

The manifold 96 also includes a plurality of internally threaded holes 132 in opposite sides of the manifold which open into the second chamber 112. A plurality of sized lines with threaded end connectors are attached to the manifold 96 and are routed as shown in FIG. 1 over the top plate of the housing 12 to different areas of the cam structure 22 and drive means 24 (FIG. 4) for supplying grease to these areas in volumes which are substantially less than those required for the reservoir areas 28. Two cam lines 142, preferably of equal length and inner diameter, are connected to the first holes 132 adjacent the orifice 116. Connectors 144 extend into the housing 12 to the respective cams 22 (FIG. 4) associated with the drums 14. A third line 148 extends from a central hole 132 to a connector 152 which extends through the top panel of the housing 12 and terminates adjacent one of the spindle drive gears of the transmission 24. Fourth and fifth equally sized lines 156 extend outwardly from the holes 132 at the downstream end of the manifold 96 to connectors 158 which extend into the housing 12 adjacent the respective drum drive gears on the drums 14. Since the transmission areas serviced by the connectors 152 and 158 require less lubricant than the cams 22, the lines 148 and 156 are sized to provide more resistance to grease flow therethrough than the cam lines 142. As can be appreciated from FIG. 1, the cam lines 142 are shorter than the cam and transmission lines 148 and 156. The lines 142 are also larger in internal diameter.

In operation, to provide grease to the high volume drum bar areas (first areas) and to the lower volume transmission and cam areas (second areas), the operator depresses the switch 56 to activate the pump 52 and provide grease through the conduit system 44 at equal rates to each of the manifolds 96 on the row units 10. The sized lines 124 extending from the first chamber 110 provide a relatively high rate of grease flow to the drum bar reservoirs 28. Since the lines 124 are of equal resistance, equal volumes are provided to each of the reservoirs 28.

The restrictor 116 limits the flow of grease from the first chamber 110 to the second chamber 112 of the manifold 96 so that the proportion of grease received from the supply line 92 at the second chamber 112 is substantially less than the proportion received at the first chamber 110. The sized lines 142, 148 and 156 extending from the second chamber 112 present differing resistance to grease flow therethrough, the resistances to flow generally being inversely proportional to the relative volumes of grease to be supplied to each of the cam and transmission areas. The gear lines 148 and 156 have a resistance to grease flow substantially greater than that of the cam lines 142 since the cams 22 require a larger proportion of the grease from a second chamber 112 than the remainder of the second areas serviced by the second chamber 112.

The operator maintains the switch 56 closed for a predetermined period of time during which all the areas on the row unit are simultaneously provided with grease. The entire distribution system beyond the pump 52 is passive and requires no control valves, flow dividers or metering pumps and therefore is relatively inexpensive, highly reliable and flexible, and compact in construction. No moving parts are required in the distribution system downstream of the pump area. The conduit system 44 and the manifold distribution systems 46 assure that equal volumes of the lubricant are distributed to each of the row units 10, and that the volume of lubricant delivered to each row unit, in turn, is properly proportioned to the service areas on the unit.

Having described the preferred embodiment, it will be apparent that modifications can be made without departing from the scope of the invention as defined in the accompanying claims.

I claim:

1. In a cotton harvester, the harvester having a plurality of cotton harvesting row units, each row unit including upright picker drum means for removing cotton from cotton plants and transmission means for driving and controlling the picker drum means, said picker drum means including first grease receiving areas adapted for receiving first preselected volumes of grease and said transmission means including cam means and gear means defining second grease receiving areas for receiving second preselected volumes of grease said first volumes being substantially greater than said second volumes, a lubrication system for automatically and simultaneously supplying grease to the first and second grease receiving areas comprising:

a source of grease on the harvester;

selectively activatable pump connected to the source of grease;

supply line means connected between the pump and the row units for supplying grease from the pump to the individual row units at approximately equal rates when the pump is activated; and manifold means associated with each of the row units and including an input connected to the supply line means for receiving the grease from the supply line means, a first chamber in communication with the input, a plurality of first outputs opening from the first chamber, and means connecting the first outputs with the first grease receiving areas for providing a first proportion of the received grease to the first grease receiving areas, said manifold further comprising a second chamber, means for connecting the second chamber and the second grease receiving areas, and restrictor means connected between the first chamber and the second chamber for providing a second proportion of the received grease from the supply line means to the second grease receiving areas, said second proportion being substantially less than said first proportion.

2. The invention as set forth in claim 1 wherein the manifold means comprises an elongated body having an internal bore, and the restrictor means comprises an orifice dividing the bore into first and second compartments defining the first and second chambers, respectively.

3. The invention as set forth in claim 1 wherein each of the manifold means is connected to the associated row unit above the picker drum means, and the supply line means comprise sized lines presenting substantially equal resistance to grease flow therethrough from the pump to the manifold means.

4. The invention as set forth in claim 1 wherein the means connecting the first outputs with the first grease receiving areas comprise sized lines presenting substantially equal resistance to grease flow therethrough from the first chamber to the first grease receiving areas.

5. The invention as set forth in claim 1 wherein the means for connecting the second chamber and the second grease receiving areas comprise sized lines for presenting differing resistances to flow therethrough between the second chamber and the second areas, the resistances to flow generally being inversely proportional to the relative volume of grease to be supplied to the second areas.

6. The invention as set forth in claim 5 wherein the second chamber includes at least two second chamber outputs, and the sized lines include: a cam line having an input end connected to one of the second chamber outputs and an output end located adjacent the cam means; and a gear line having an input end connected to the other second chamber output and an output end located adjacent the gear means.

7. The invention as set forth in claim 6 wherein the gear line has a resistance to grease flow substantially greater than that of the cam line.

8. In a harvester having a plurality of generally identical harvesting units, each harvesting unit including first grease receiving areas adapted for receiving first preselected volumes of grease and second grease receiving areas adapted for receiving second preselected volumes of grease, said first volumes being substantially greater than said second volumes, a lubrication system for automatically and simultaneously supplying grease to the first and second grease receiving areas comprising:

a source of grease on the harvester;

a selectively activatable pump connected to the source of grease;

a manifold located adjacent each of the row units;

a passive conduit system connected to the pump and including sized conduit means for supplying an equal volume of grease to each of the manifolds while the pump is activated;

wherein said manifold includes a first chamber connected to the conduit means and a second chamber located downstream of the first chamber, and means restricting flow between the first and second chambers;

means for connecting the first grease receiving areas with the first chamber for receiving a first portion of the grease received by the manifold from the conduit means; and means connecting the second chamber with the second grease receiving areas for supplying a second proportion of the grease received by the manifold from the conduit means to the second grease receiving areas.

9. The invention as set forth in claim 8 wherein the means for connecting the second chamber includes sized conduits presenting substantially different resistances to flow from the second chamber to the second grease receiving areas, the resistances to flow being generally inversely proportional to the relative volumes of grease to be supplied to each of the second areas.

10. The invention as set forth in claim 8 wherein the means connecting the first chamber includes sized conduits presenting a preselected resistance to grease flow therethrough from the first chamber to the first grease receiving areas.

11. The invention as set forth in claim 8 wherein the manifold comprises an elongated section of stock having an internal bore and the means restricting includes an orifice located within the bore between the first and second chambers.

12. The invention as set forth in claim 8 wherein the harvesting units comprise housings having upper panels and wherein the manifold is positioned on the upper panel and the means connecting is routed along the upper panel.

* * * * *